United States Patent Office 3,836,485
Patented Sept. 17, 1974

3,836,485
SOLID EPOXY RESINS FROM GLYCIDYL ETHERS OF HYDROGENATED BISPHENOLS OR HYDROGENATED NOVOLACS AND AROMATIC OR CYCLOALIPHATIC DICARBOXYLIC ACIDS
Pong Su Shih, Clute, Tex., assignor to The Dow Chemical Company, Midland, Mich.
No Drawing. Continuation-in-part of abandoned application Ser. No. 229,181, Feb. 24, 1972. This application June 4, 1973, Ser. No. 366,390
Int. Cl. C08g 30/10
U.S. Cl. 260—2 EP
20 Claims

ABSTRACT OF THE DISCLOSURE

Solid epoxy resins are prepared from diglycidyl ethers of a hydrogenated bisphenol or hydrogenated novolacs such as hydrogenated bisphenol A and an aromatic or cycloaliphatic dicarboxylic acid such as isophthalic acid. These solid resins may be comminuted into a stable free-flowing powder useful as epoxy resin powder coatings having excellent weathering properties.

---

This application is a continuation-in-part of my copending application Ser. No. 229,181, filed Feb. 24, 1972, and now abandoned.

This invention relates to epoxy resins and more particularly it relates to epoxy resins which are useful as powder coatings for outdoor service.

Higher molecular weight epoxy resins suitable for powder coatings usually have a Durran's softening point of from about 80° to about 120° C. and above and have usually been prepared from glycidyl ethers of bisphenols and bisphenols. However, such resins possess poor weathering characteristics.

It has now been unexpectedly discovered that the epoxy resin compositions of the present invention have excellent weathering characteristics and are suitable for use in epoxy powder coating compositions.

The novel epoxy resin compositions of the present invention comprises a solid product having a softening point above about 80° C. and preferably from about 90° to about 120° C. and which can be comminuted to a free-flowing stable powder which results from the reaction of a diglycidyl ether of a hydrogenated bisphenol or hydrogenated novolac having an average functionality of from about 2.01 to about 2.6, preferably from about 2.01 to about 2.3, and an aromatic or cycloaliphatic dibasic acid wherein the quantities of the glycidyl ether and the dibasic acid is such as to provide an epoxy:COOH ratio of from about 1.1:1 to about 2.0:1, preferably from about 1.1:1 to about 1.8:1, and most preferably from about 1.3:1 to about 1.5:1.

The novel epoxy resins of the present invention are suitably represented by the general formulas

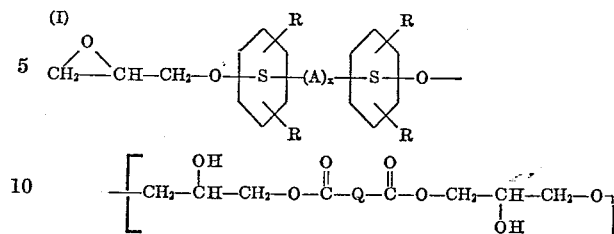

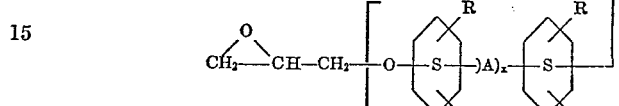

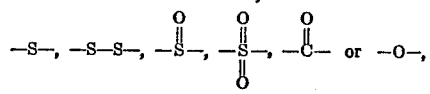

Wherein A is a divalent aliphatic hydrocarbon group having from 1 to 6 carbon atoms, $$-S-, -S-S-, -\overset{O}{\underset{}{S}}-, -\overset{O}{\underset{O}{S}}-, -\overset{O}{\underset{}{C}}- \text{ or } -O-,$$

Q is the organic residue of an aromatic dibasic acid, each R is independently hydrogen, an aliphatic hydrocarbon group having 1 to about 6 carbon atoms, chlorine or bromine, n has an average value such that the average EEW of the resin is at least about 700, preferably from about 1000 to about 1550 and x is zero or 1.

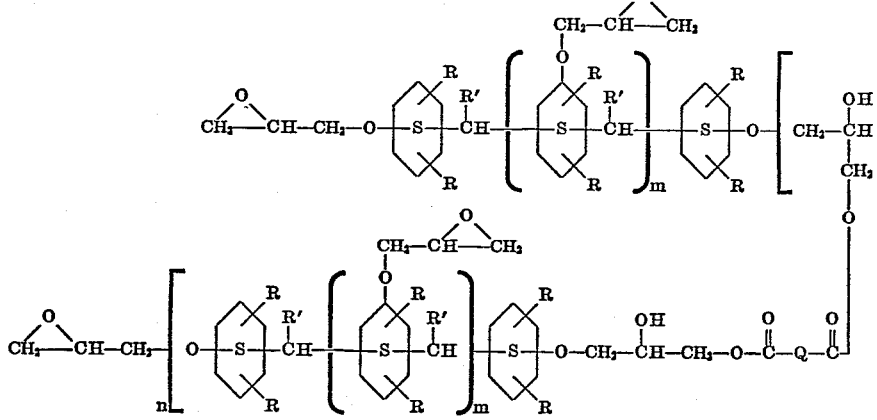

wherein each R, Q and n are as defined in Formula I and each R' is independently hydrogen or an aliphatic hydrocarbon group having 1 to about 6 carbon atoms, and each m has an average value of from about 0.01 to about 0.6, preferably from about 0.01 to about 0.3.

The term free-flowing stable powder used herein means that the epoxy resin when ground or otherwise comminuted into a free flowing powder will remain free flowing for at least 48 hours.

The novel epoxy resin compositions of the present invention are readily prepared by reacting a diglycidyl ether of a hydrogenated bisphenol with an aromatic or cycloaliphatic dibasic acid at a temperature of from about 80 to about 210° C. in the presence of a suitable catalyst such as tertiary amines, quaternary ammonium compounds, quaternary phosphonium compounds, or the like, for a time sufficient to produce the product, usually from about 0.5 to about 30 hours. It is usually desirable, particularly when laboratory apparatus is employed, to preblend all of the reactants and then add the catalyst thereto.

Suitable catalysts include, for example, quaternary ammonium compounds such as benzyl trimethyl ammonium chloride, amines such as N-methylmorpholine and phosphonium compounds such as those compounds disclosed in U.S. Pat. No. 3,477,990 and Canadian Pat. No. 893,191.

Suitable glycidyl ethers of a hydrogenated bisphenol include the glycidyl ethers of such hydrogenated bisphenols as, for example, hydrogenated p,p'-isopropylidine-diphenol, hydrogenated p,p'-methylenediphenol, hydrogenated dihydroxydiphenyl sulfone, hydrogenated 4,4'-dihydroxy biphenyl, hydrogenated 4,4'-dihydroxydiphenyl oxide, mixtures thereof and the like.

Suitable aromatic carboxylic dibasic acids include, for example, phthalic acid, terephthalic acid, isophthalic acid, and those acids represented by the formula (III).

(III)
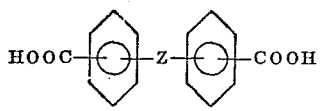

wherein Z is independently selected from the same group as A in Formula I, such as, for example, 4,4'-diphenylsulfide dicarboxylic acid, 4,4'-diphenyldisulfide dicarboxylic acid, 2,5-furan dicarboxylic acid and mixtures thereof.

Suitable cycloaliphatic dibasic acids include, for example, tetrahydrophthalic acid, methyltetrahydrophthalic acid, hexyltetrahydrophthalic acid, dimethylhexahydrophthalic acid, hexylhexahydrophthalic acid, bromotetrahydrophthalic acid, chlorotetrahydroisophthalic acid, chlorendic acid, methyltetrahydroterephthalic acid, mixtures thereof and the like.

The novel epoxy resin compositions of the present invention may be cured to a thermoset product by any of the well known catalysts or curing agents such as primary, secondary and tertiary amines, amides, acid anhydrides and the like.

The quantities of curing agent or catalysts employed depends upon the particular catalyst or curing agent employed and the particular catalyst or curing agent depends upon the properties desired as those skilled in the epoxy resin art are readily aware. Those not so skilled in this art but who desire to make use of this invention are directed to the *Handbook of Epoxy Resins*, Lee and Neville, McGraw-Hill Book Co., 1967.

Although the novel epoxy resins of the present invention are particularly useful in epoxy resin powder coating formulations they may also be employed in molding compositions, admixed with suitable solvents for use in solution coatings, castings, potting compounds, adhesives and the like.

The following examples are illustrative of the present invention but are not to be construed as to limiting the scope thereof in any manner.

EXAMPLE 1

To a reaction vessel equipped with a means for temperature control, stirring and nitrogen purging were added 600 grams of the diglycidyl ether of hydrogenated bisphenol A having an epoxide equivalent weight of 212 and 170 grams of isophthalic acid. After heating to a temperature of 150° C., 0.9 grams of ethyltriphenyl phosphonium acetate-acetic acid complex catalyst was added and the temperature maintained at 150° C. by cooling or heating as required for about 5 hours. The resultant epoxy resin had an average epoxide equivalent weight (EEW) of 1200 and a Durran's softening point of 95° C.

Powder coatings were then prepared from the above resin designated as resin A employing the following compositions designated as Formulations A and B by blending components (1), (7), (8) and (9) on a two roll mill for about 10 minutes. Then components (3) and (4) or (5) and (6) as indicated were blended with the previous blend on the two roll mill for about 3 minutes. The above blend was then ground to a fine free-flowing powder on a hammermill. Then the powder was screened through a 200 mesh U.S. Standard Sieve Series screen.

For comparative purposes, powder coatings were prepared from a commercially available solid epoxy resin based upon bisphenol-A having an average EEW of 950 and a Durran's softening point of 100° C. designated as D.E.R.® 664 commercially available from The Dow Chemical Company. These formulations were designated as C and D.

| Component | Formulation | | | |
|---|---|---|---|---|
| | A | B | C | D |
| (1) Resin A, gms | 300 | 300 | | |
| (2) D.E.R.® 664, gms | | | 300 | 300 |
| (3) Trimellitic anhydride, gms | 30.7 | | 46.5 | |
| (4) Stannous octoate, accelerator, gms | 3.0 | | 3.0 | |
| (5) Dicyandiamide, gms | | 4.5 | | 6.4 |
| (6) 82% dicyandiamide, 17% 2-methylimidazole and 1% Cab-O-Sil (by wt.) gms | | 4.5 | | 6.4 |
| (7) TiO₂ pigment, gms | 225 | 225 | 225 | 225 |
| (8) Aerosil® ¹, gms | 9.0 | 9.0 | | |
| (9) Modaflow ² | 4.5 | 4.5 | 4.5 | 4.5 |

¹ Aerosil® is a high surface area submicroscopic pyrogenic silica commercially available from Degussa, Inc.
² Modaflow is a flow control agent commercially available from Monsanto Co.

Each of the above formulations were electrostatically sprayed onto #5412 Steel Q panels and cured at 200° C. for 7 minutes for Formulations A, C and D and 15 minutes for Formulation B, and then a portion of the panels were placed in a "Fade-O-Meter" and the remaining panels were placed in a "Weather-O-Meter" to obtain weathering properties of the coatings. These tests were conducted according to ASTM D–822 and ASTM E–42.

The results were as follows:

| | "Fade-O-Meter", percent gloss retention | | | | "Weather-O-Meter", percent gloss retention | | | |
|---|---|---|---|---|---|---|---|---|
| Formulation | 140 hrs. | 300 hrs. | 500 hrs. | 800 hrs. | 100 hrs. | 300 hrs. | 400 hrs. | 1,000 hrs. |
| A | 100 | 90 | 90 | 92 | 90 | 64 | 58 | N.D. |
| B | 100 | 100 | 100 | 100 | 92 | 76 | 76 | 69 |
| C | ¹ 32/y | ² 7/yc | ³ N.D. | N.D. | 81 | 15/y | 13/y | N.D. |
| D | 55/y | 17/yc | 13/yc | N.D. | 69 | 32/y | 14/y | 14/yc |

¹ y=yellowing of the surface.
² yc=yellowing and chalking of the surface.
³ N.D.=not determined.

EXAMPLE 2

A solution coating was prepared by blending the following components.

300 grams of Resin A prepared in Example 1,
213 grams of a urea-formaldehyde resin curing agent commercially available from Reichhold Chem., Inc., as Beckamine P–138–60,
343 grams of titanium dioxide pigment,
525 grams of a solvent mixture containing 3 parts by weight of xylene, 2 parts methylisobutyl ketone and 2 parts 2-ethoxyethanol,
8.6 grams of an antiflooding agent: a high molecular weight unsaturated polycarboxylic acid commercially available from Byk-Mallinckrodt. Chem. Produkte RmbH as BYK P104.

The coating was applied to a Q panel and cured at 170° C. for about ½ hour. The coated panel was placed in a Weather-O-Meter and the following results obtained.

Hours of Exposure:       Percent gloss retention
   73 _____ 95
   216 _____ 92
   547 _____ 87

EXAMPLE 3

A molding composition was prepared from resin A prepared in Example 1 by blending the following components.

50 grams of Resin A
5.0 grams of trimellitic anhydride

Resin A was ground to a coarse powder and admixed with the curing agent on a roll mill. The mixture was placed into a preheated mold and cured at 177° C. at 1000 p.s.i.g. for 30 sec. and then postcured at atmospheric pressure and 177° C. for about 30 minutes.

The resultant casting was placed in a Weather-O-Meter and after various periods of exposure, the casting was evaluated by an Arc Resistant Test, ASTM D–495. The results were as indicated below.

| Time in Weather-O-Meter, hrs.: | Arc resistance, sec. |
|---|---|
| Initial | 85 |
| 331 | 85 |
| 706 | 85 |

I claim:

1. An epoxy resin having a Durran's softening point of from at least 80° C. to about 120° C. and which can be comminuted into a free flowing stable powder represented by the general formulas

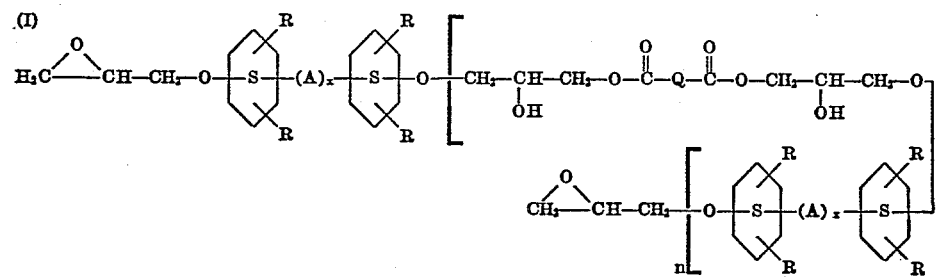

wherein A is a divalent aliphatic hydrocarbon group having from 1 to about 6 carbon atoms,

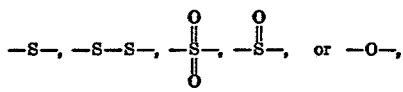

Q is the residue of a dibasic aromatic or cycloaliphatic carboxylic acid which would result from the removal of the carboxyl groups, each R is independently hydrogen, an aliphatic hydrocarbon group having from 1 to about 6 carbon atoms, chlorine or bromine, $n$ is an integer such that the average EEW of the resin is at least about 700 and $x$ has a value of zero or 1, and

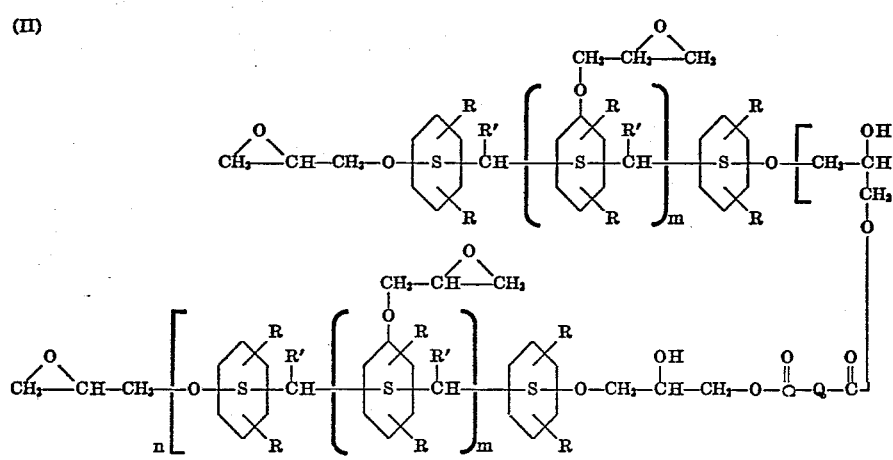

wherein each R, Q and $n$ are as defined in Formula I and each R' is independently hydrogen, or an aliphatic hydrocarbon group having 1 to about 6 carbon atoms, and each $m$ has an average value of from about 0.01 to about 0.6.

2. An epoxy resin of Claim 1 represented by Formula I wherein Q is the residue of an aromatic acid.

3. An epoxy resin of Claim 2 wherein $x$ has a value of 1.

4. An epoxy resin of Claim 3 wherein A is an isopropylidene group and Q is the residue of isophthalic acid.

5. An epoxy resin of Claim 1 represented by Formula II wherein R' is hydrogen and $m$ has an average value of from about 0.01 to about 0.3.

6. An epoxy resin of Claim 5 wherein each R is hydrogen and Q is the residue of an aromatic dibasic acid.

7. A thermosettable composition comprising an epoxy resin of Claim 1 and a catalytic amount of a curing catalyst or a curing amount of a curing agent.

8. A thermosettable composition comprising an epoxy resin of Claim 2 and a catalytic amount of a curing catalyst and a curing amount of a curing agent.

9. A thermosettable composition comprising an epoxy resin of Claim 3 and a catalytic amount of a curing catalyst and a curing amount of a curing agent.

10. A thermosettable composition comprising an epoxy resin of Claim 4 and a catalytic amount of a curing catalyst and a curing amount of a curing agent.

11. A thermosettable composition comprising an epoxy resin of Claim 5 and a catalytic amount of a curing catalyst and a curing amount of a curing agent.

12. A thermosettable composition comprising an epoxy resin of Claim 6 and a catalytic amount of a curing catalyst and a curing amount of a curing agent.

13. The thermosettable composition of Claim 10 wherein said curing agent is an amide.

14. The thermosettable composition of Claim 13 wherein said curing agent is dicyandiamide.

15. The thermosettable composition of Claim 14 wherein the dicyandiamide is accelerated with an accelerating amount of an imidazole.
16. An article coated with the composition of Claim 7.
17. An article coated with the composition of Claim 8.
18. An article coated with the composition of Claim 9.
19. An article coated with the composition of Claim 10.
20. An article coated with the composition of Claim 11.

References Cited

UNITED STATES PATENTS

| | | | |
|---|---|---|---|
| 3,425,961 | 2/1969 | Jellinek et al. | 260—2 |
| 3,493,631 | 2/1970 | Christenson et al. | 260—834 |
| 3,551,517 | 12/1970 | Dowbenko et al. | 260—834 |
| 3,576,903 | 4/1971 | Groff | 260—824 |

FOREIGN PATENTS 1,094,138   12/1967   Great Britain.

OTHER REFERENCES

Abstract of Netherlands application 6609397, published Jan. 11, 1967, Chem. Abstr. 67, 22429g (1967).

WILLIAM H. SHORT, Primary Examiner

E. A. NIELSEN, Assistant Examiner

U.S. Cl. X.R.

117—21; 260—2 EC, 2 EA, 2 N, 37 EP, 59, 78.4 EP